United States Patent [19]

Shaffer

[11] Patent Number: 5,614,714
[45] Date of Patent: Mar. 25, 1997

[54] THERMAL IMAGING DEVICE AND METHOD

[75] Inventor: Stephen P. Shaffer, West Hills, Calif.

[73] Assignee: Hughes Electronics, Los Angeles, Calif.

[21] Appl. No.: 524,720

[22] Filed: Sep. 6, 1995

[51] Int. Cl.⁶ ..................................... H04N 3/09
[52] U.S. Cl. ........................... 250/334; 348/168
[58] Field of Search ............... 250/334; 348/167, 348/168

[56] References Cited

U.S. PATENT DOCUMENTS 4,419,692  12/1983  Modisette et al. ............... 250/334
5,386,642  2/1995   Spies et al. ..................... 33/708

Primary Examiner—Carolyn E. Fields
Attorney, Agent, or Firm—Michael W. Sales; Wanda K. Denson-Low

[57] ABSTRACT

A thermal imaging device (10) includes a rotational scanning mirror (32) scanning a viewed scene across a linear detector array (50) including plural spaced apart detector elements (50', 50", 50"', . . . ). The scanner includes an annular magnetic track (174) carried on the rotational scanning mirror (32), and a stationary reading head (178) responding to passage of magnetic domains (176) on the magnetic track (174) to commutate position of the rotational scanning mirror (32). The reading head (178) includes pairs of magneto-resistive elements (182) which are physically positioned relative to one another and are electrically connected so as to be simultaneously exposed to respective magnetic flux maxima and magnetic flux minima as the scanner mirror (32) rotates. As a result, domain-to-domain variations of flux intensity of the magnetic domains (176) on the magnetic track (174) are averaged out. Consequently, a much improved quality of commutation signal results, with improved timing correspondence of the rotational position and speed of the scanning mirror to the requirements of the thermal imaging device (10).

9 Claims, 4 Drawing Sheets

THERMAL IMAGING DEVICE AND METHOD

This invention was made with government support under Contract No. DAAB07-91-C-K254 awarded by the Department of Army. The Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes), or invisible near-infrared light, in a first frequency band and responsively providing a greatly intensified visible image in a phosphorescent monochrome yellow-green light.

Such an image intensifier night vision device converts available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window" referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the viewed scene across the detector. In either case, because the detector is cooled to cryogenic temperatures, it can proved an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

SUMMARY OF THE INVENTION

In view of the deficiencies of the conventional technology, a primary object for this invention is to overcome one or more of these deficiencies.

Yet another object for this invention is to provide a thermal imaging device of the type which incorporates a moving reflector as a scanner of the scene to be imaged.

Another object for this invention is to provide such a thermal imaging device in which the position of the moving reflector relative to the scene to be imaged is sensed by a magneto-resistive sensor;

Still another objective for the present invention is to provide such an imaging device with a moving reflector in which the reflector takes the form of a multi-faceted mirror which spins about a central axis, and the rotational position of the mirror relative to the scene to be imaged is sensed by a magneto-resistive sensor.

Accordingly, the present invention provides according to one aspect thereof a thermal imaging device including an objective lens receiving and focusing invisible infrared light from a scene; a moving scanner receiving and reflecting infrared light from said objective lens; a detector receiving the reflected infrared light from the scanner and responsively providing electrical signals; a processing circuit receiving the electrical signals from the detector and responsively providing imaging electrical signals; a display device for receiving the imaging electrical signals and responsively providing a visible image replicating the scene; the moving scanner carrying a magnetic track having alternating opposite magnetic domains providing variable magnetic flux extending between the magnetic domains; a sensor head having plural magneto-resistive elements disposed to be affected by the alternating opposite magnetic domains as the scanner moves, the sensor head disposing the magneto-resistive elements to align in alternate pairs with respective magnetic flux maxima and magnetic flux minima of the magnetic domains, and a bifurcated sensor circuit having a pair of opposite branches and connecting the alternate pairs of magneto-resistive elements in series in the opposite branches, whereby the magneto-resistive elements in the alternate pairs are simultaneously exposed to respective flux maxima and flux minima as the scanner moves.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention;

FIG. 4 provides a fragmentary and somewhat schematic view of a part of the thermal imaging device;

DETAILED DESCRIPTION OF AN EXEMPLARY PREFERRED EMBODIMENT OF THE INVENTION

An overview

Figure 1:
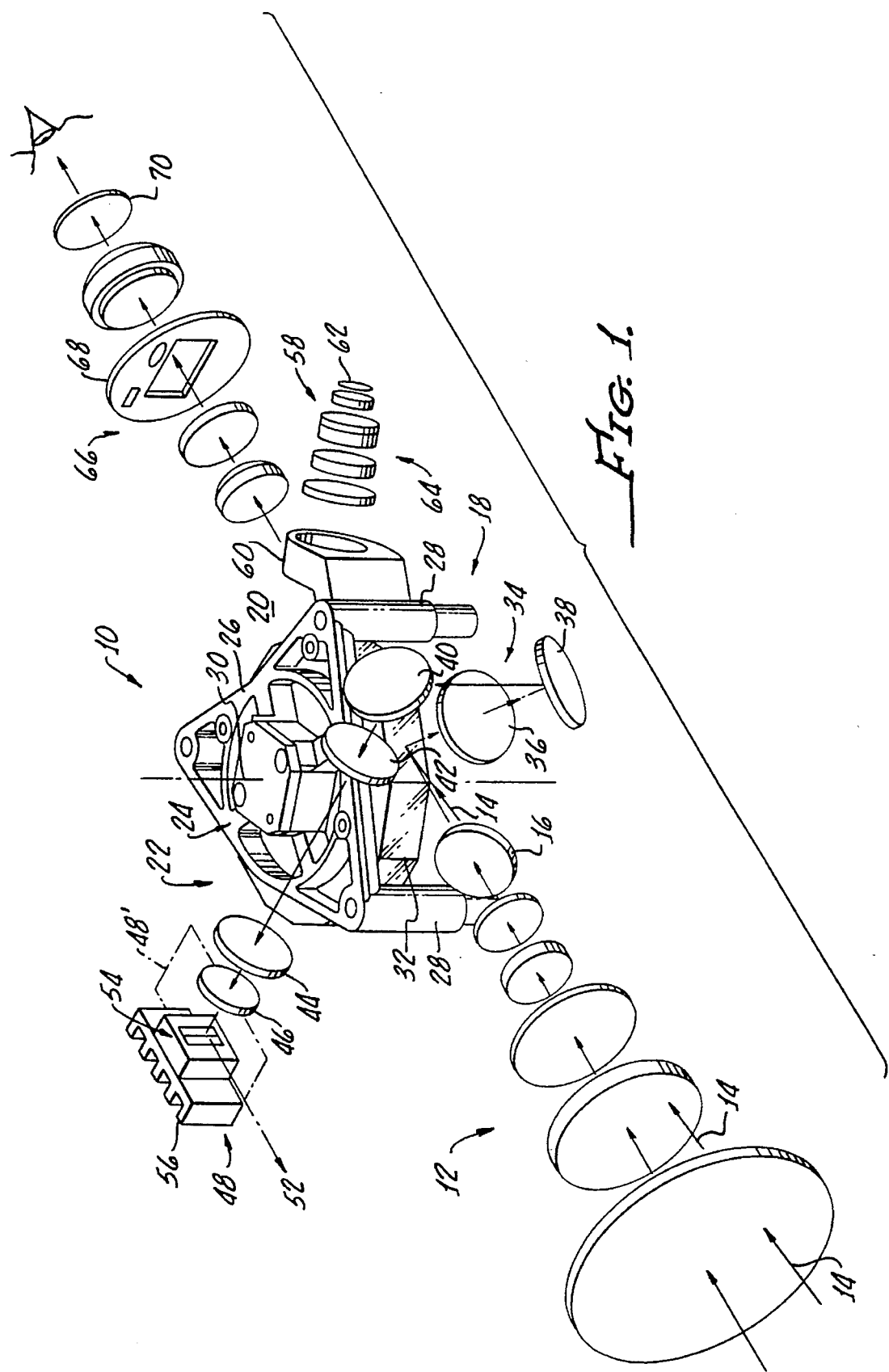

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (indicated with reference numerals 12', 12", 12''', etc.), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and columnates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets or faces 32a, 32b, etc. only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets 32a, 32b, etc., continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet 32a, 32b, etc., of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's (not visible in FIG. 1, but indicated with the arrowed numeral 62'), each individually emitting visible light when energized. The LED's 62' of the array 62 are arrayed linearly along a vertical line similarly to the linear arrangement of the detector elements 50' of the detector 50. The LED's 62' provide respective portions of a visible image, as will become apparent. Light from the LED's 62' is columnated and projected by a projection lens group, generally indicated with the numeral 64, onto a facet of the mirror 32, and as indicated by the arrowed reference numerals 14'. The numerals 14 and 14' are used intentionally with respect to the invisible infrared light carrying image information from a scene, and the visible light replicating the scene for viewing by a user of the device 10.

From the mirror 32 (i.e., from a particular facet 32' of this mirror) the visible light from the LED's 62' is reflected to an ocular lens group, generally indicated with the numeral 66. The ocular lens group 66 includes several individual lenses, indicated with the respective reference numerals 66', 66'', etc. Along with these lenses 66', 66'', etc a status display unit 68 is interposed in the ocular lens group 66. This status display unit 68 defines an aperture through which the visible image is perceived, and includes several individual LED's which when illuminating are peripherally visible to the user of the device 10. These individual LED's are indicated with the numerals 68', 68'', etc. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
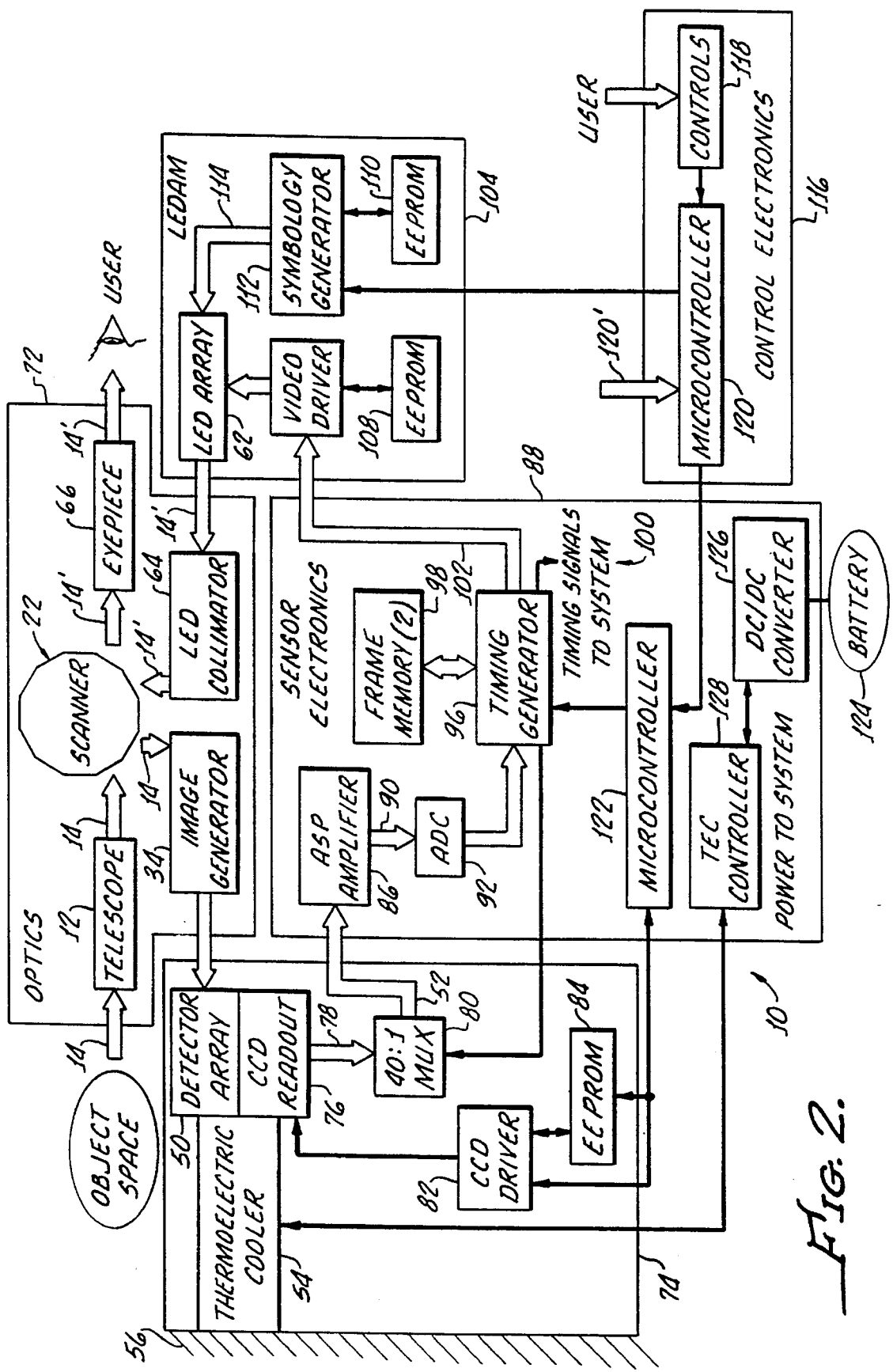

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's 62' in response to this signal. An electrically erasable programmable read-only memory (EEPROM) 108 has an interface with the driver circuit 106 for receiving and storing for future use values to be used in the operation of the device 10. For example, EPROM 108 may be used to store stadia line spacing information, which would allow the device 10 to be used to estimate ranges to personnel or vehicles of known sizes. In order to provide a user of the imaging device 10 with additional useful image information, such as spaced apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 118, which is part of a distributed control system also including another microprocessor 122 in the P&C module 88. The microprocessors 120 and 122 have an interface with the EEPROM's 84, 108 and 110, along with the circuits served by the data and commands stored in these EEPROM's. The microprocessor 120 has an externally-accessible data interface port 120' so that all of the data and programming stored in the microprocessors 120, 122, and the EEPROM's interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figure 3:
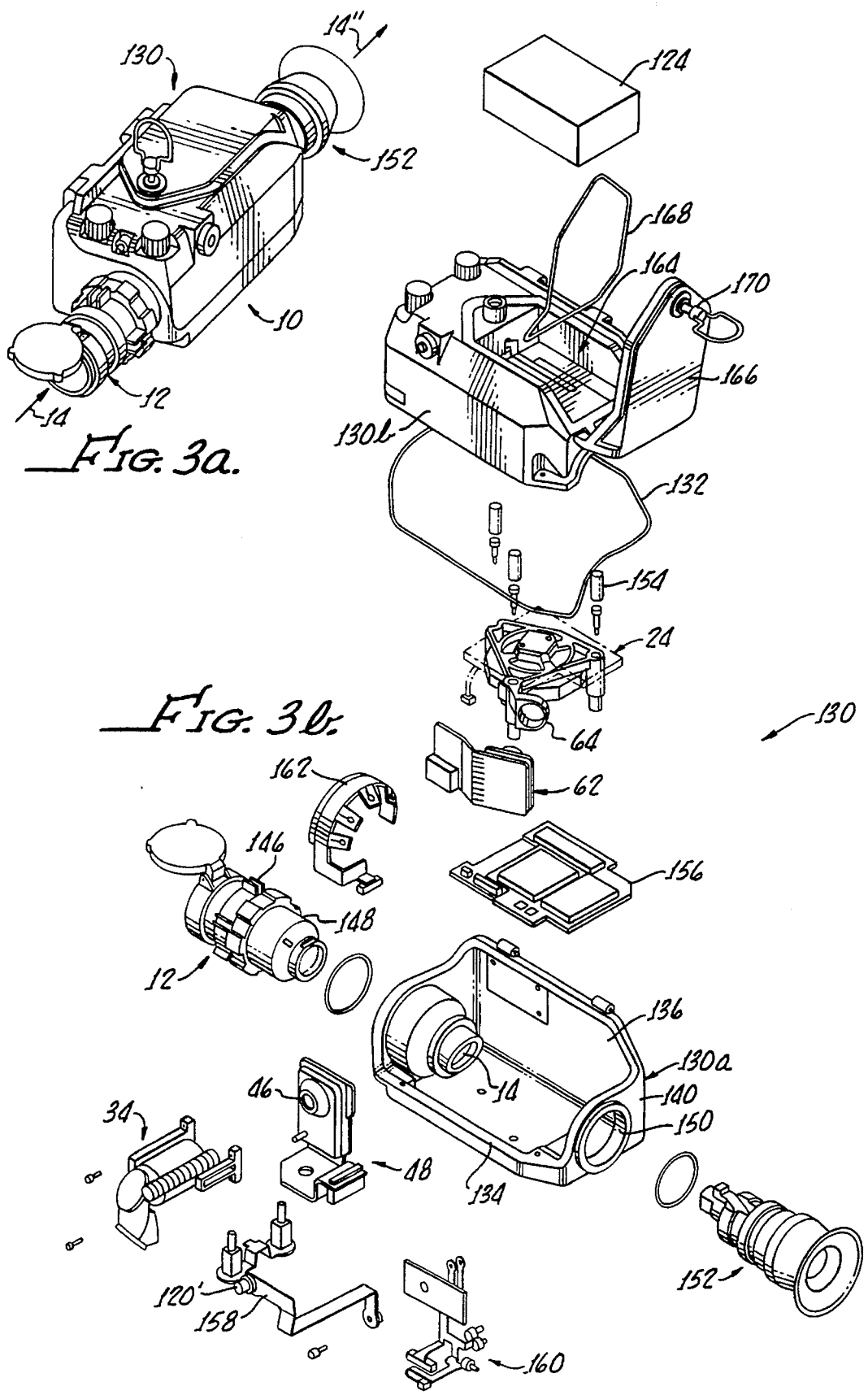

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a reentrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the reentrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a.

The Scanner 32

Viewing now FIGS. 4–7, details of the scanning 22, and particularly of scanning mirror 32, are presented. As was mentioned above, the scanner 22 includes a multifaceted mirror 32, which is rotated by the motor 30 in order to scan the scene viewed via the objective optics group 12 across the detector 50. In order to sense and control both the speed and position of the scanning mirror 32, as it spins, this scanning mirror carries on its lower surface 172 a concentric annulus or track 174 of magnetic tape material. This annulus of magnetic tape material 174 is concentric with the axis of rotation for the mirror 32, which axis is established by the drive shaft of motor 30 (not seen in the drawing Figures, but indicated with the numeral 30' on FIG. 4). This annulus 174 of magnetic tape material is similar to the magnetic tape material used to record audio or video tape recordings, and presents a circumferentially arrayed plurality of oppositely-magnetized and axially disposed magnetic domains, indicated on FIG. 4 with the numerals 176', 176", 176'", etc.

Figure 5:
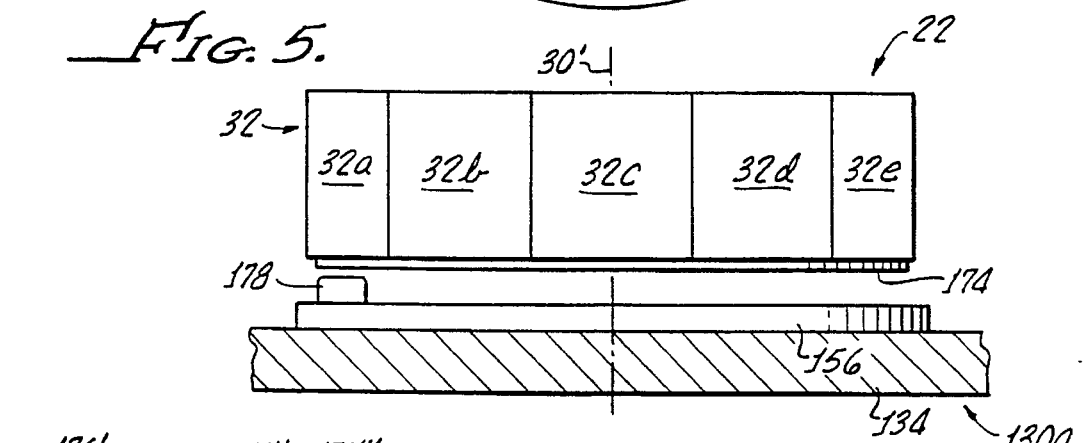
FIG. 5 is a somewhat schematic side elevation view partially in cross sectional view of a part of the housing of the thermal imaging device, with functionally related components thereof.
Figure 6:
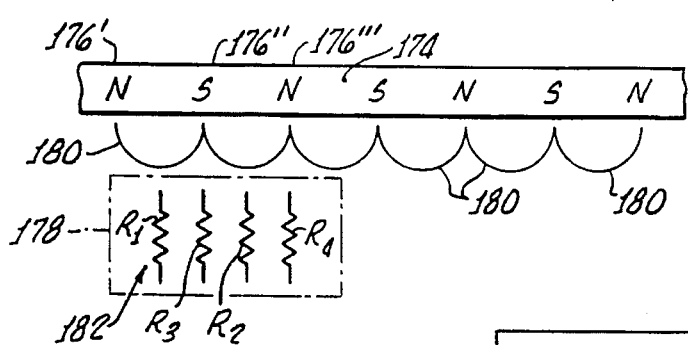
FIG. 6 is s schematic representation of magnetic domains of a part of the thermal imaging device in relationship to a sensing device thereof.

FIG. 5 shows that the electronics assembly 156 carries a sensing head 178 positioned axially congruently with and spaced slightly axially away from the annulus 174 of magnetic tape material. This sensing head 178 is positioned sufficiently closely to the magnetic domains 176 that magnetic flux lines extending between these domains (as is indicated on FIG. 6 with the reference numeral 180) affect the sensing head 178 as the scanning mirror 32 spins. FIG. 6 also provides schematically an indication that the sensing head 178 includes four spaced apart magneto-resistive elements, indicated with the numeral 182. These magneto-resistive elements 182 are indicated individually on FIG. 6 with the characters R1, R2, R3, and R4, and vary in their resistance in response to the magnet field to which they are subjected.

Figure 4:
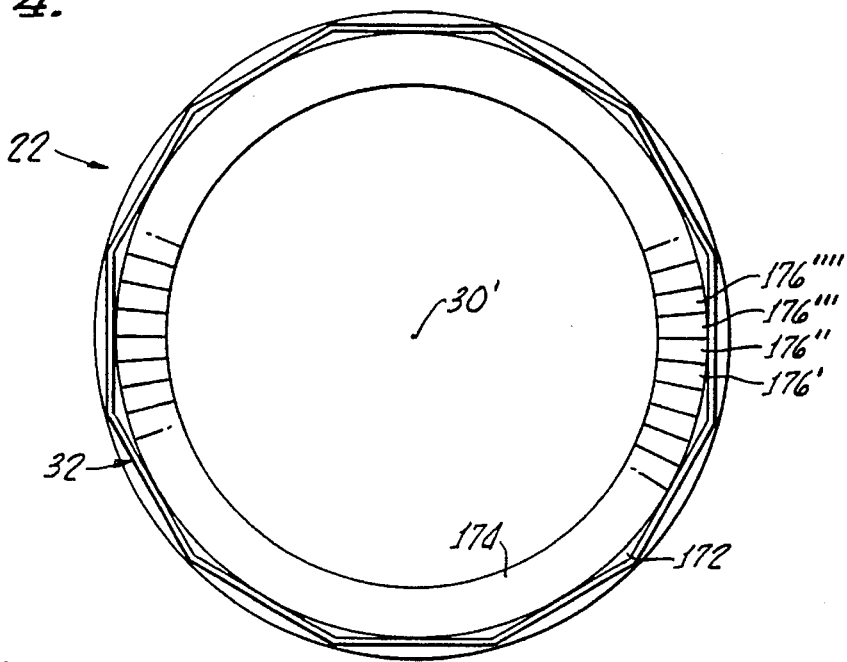

As is seen in FIGS. 4 and 6, the magnetic domains 176 are spaced circumferentially of the scanning mirror 32. Similarly, the magneto-resistive elements 182 are spaced correspondingly in the circumferential direction of the scanning mirror 32 by sensing head 178 so that in one rotational position of the scanning mirror 32 resistor elements R1 and R2 substantially align with the peaks of the magnetic flux lines between adjacent domains 176, while the resistor elements R3 and R4 substantially align with the flux minima between adjacent domains 176. It will be understood that in a next sequential rotational position of the scanning mirror 32, the resistor elements R3 and R4 align with the peaks of the magnetic flux lines, while the resistor elements R1 and R2 align with the flux minima between domains 176.

Figure 7:
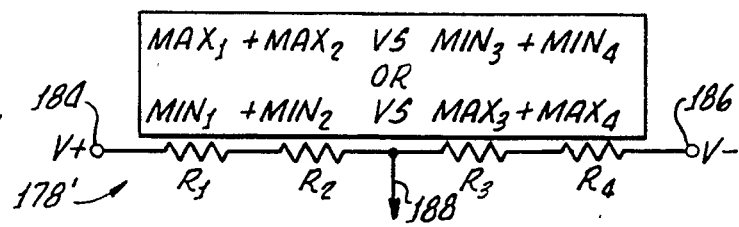
FIG. 7 provides an electrical schematic of elements of the sensing device seen in FIG. 6 as they are electrically connected to one another according to the present invention.

FIG. 7 shows that alternate ones of the magneto-resistive sensing elements in the circumferential direction of the magnetic domains 176 are connected in series on opposite sides of a bifurcated sensing circuit 178'. This sensing circuit 178' has a connection to a positive voltage source at a node 184, and to a negative voltage source at a node 186. As a result, the dithered opposite positive and negative voltage output signal appearing at a center tap 188 is indicative of the difference between averaged flux maxima values of the magnetic domains 176 compared to averaged flux minima values, and is indicative of the rotation and rotational position of the scanning mirror 32. As is seen in the table superimposed over the schematic circuit diagram of FIG. 7, the summed maximum values of flux between two adjacent domains 176 are first contrasted to the summed minimum flux values between two adjacent domains. Next the summed minimum flux values are contrasted to the sum of the two next-sequential maximum flux values. As a result of this summing (i.e., effective averaging) of sequentially adjacent flux values and the contrasting of these averaged values with intervening flux minimum values, the domain-to-domain variations of flux intensity of the magnetic tape 174 is averaged out. The result is a much improved quality of switching signal from the sensing head 178, and improved timing correspondence of the rotational position and speed of the scanning mirror 32 to the requirements of the imaging device 10. It will be understood that more than two magnetic domain maxima may be sensed and compared to intervening magnetic minima in order to further average out domain-to-domain variations of the magnetic track 174.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A thermal imaging device comprising:

an objective lens for receiving and focusing invisible infrared light from a scene;

a movable scanner for receiving and reflecting infrared light from said objective lens;

a detector for receiving the reflected infrared light from said scanner and responsively providing electrical signals;

a processing circuit for receiving the electrical signals from said detector and responsively providing imaging electrical signals;

a display device for receiving the imaging electrical signals and responsively providing a visible image replicating the scene;

said movable scanner carrying a circular magnetic track having alternating opposite magnetic domains providing circumferentially varying magnetic flux extending between said magnetic domains, said circumferentially varying magnetic flux having plural magnetic flux minima alternating with plural magnetic flux maxima both arrayed circumferentially around said magnetic track;

a sensor head having plural magneto-resistive elements disposed to be affected by said alternating opposite magnetic domains as said scanner moves, said sensor head disposing said magneto-resistive elements to align in two groups of elements each including at least an alternate pair of said plural elements, each element of each of said two groups of elements individually aligning substantially simultaneously with one of a respective magnetic flux maxima or with a magnetic flux minima of said magnetic domains, and a bifurcated sensor circuit having a pair of opposite branches and connecting said magneto-resistive elements of one of said two groups of elements in series with one another in one of said opposite branches and also connecting said magneto-resistive elements of the other of said two groups in the other of said opposite branches, whereby all of said plural magneto-resistive elements in said two groups of elements are simultaneously exposed to one of a respective flux maxima and flux minima as said scanner moves.

2. The thermal imaging device of claim 1 wherein said scanner is a rotational scanner, said magnetic track being circumferentially disposed on said rotational scanner.

3. The thermal imaging device of claim 2 wherein said magnetic track is defined by a circumferentially extending magnetic tape carried by said rotational scanner.

4. The thermal imaging device of claim 2 wherein said rotational scanner includes a disk-like multi-faceted mirror, said multi-faceted mirror having a plurality of mirror facets which are substantially parallel, said multi-faceted mirror being rotational about an axis substantially parallel with said mirror facets, and said multi-faceted mirror defining a surface perpendicular to said rotational axis, and said surface of said mirror carrying said magnetic track.

5. The thermal imaging device of claim 4 wherein said multi-faceted mirror is carried by a scanner frame, said sensor head being carried by a circuit board captured between said scanner frame and a housing of said thermal imaging device.

6. The thermal imaging device of claim 5 wherein said scanner frame carries a scanner motor having a rotational output shaft carrying said scanner mirror, said scanner mirror having a lower surface substantially parallel with said circuit board, and said sensor head extending from said circuit board toward but short of said lower surface of said scanner mirror to confront said magnetic track in closely spaced operative association therewith.

7. A method of operating a thermal imaging device comprising steps of:

providing an electrical detector for infrared light;

providing a rotational multi-faceted scanner mirror receiving and reflecting infrared light from a scene to said detector;

using said detector to responsively provide electrical signals;

using a display device to receive said electrical signals and to responsively provide a visible image replicating the scene;

providing an annular magnetic track on said scanner mirror which magnetic track provides a plurality of adjacent magnetic domains of known substantially uniform pitch dimension and alternating magnetic polarity disposed around said magnetic track, said plurality of magnetic domains providing magnetic flux fields varying circumferentially of said magnetic track, which magnetic flux fields alternate between a maxima value between adjacent domains and a minima value substantially at the center of each domain;

providing a stationary sensor head having plural magneto-resistive elements disposed to be affected by said alternating opposite magnetic domains as said scanner mirror rotates, said sensor head disposing all of said magneto-resistive elements to align in alternate pairs with respective magnetic flux maxima and magnetic flux minima of said magnetic domains, and a bifurcated sensor circuit having a pair of opposite branches and connecting said magneto-resistive elements aligning with a magnetic flux minima in series with one another in one of said opposite branches and also connecting said magneto-resistive elements aligning with a magnetic flux maxima in series in the other of said opposite branches, whereby said magneto-resistive elements in said alternate pairs are substantially simultaneously exposed to respective flux maxima and flux minima as said scanner mirror rotates;

applying a voltage between a center tap of said bifurcated electrical circuit and said opposite branches thereof, and using alternating voltage drop signals appearing between said opposite branches and said center tap in opposition to one another to sense relative rotation of said scanner mirror past said sensor head.

8. The method of claim 7 further including the step of using a circumferentially extending magnetic tape carried by said rotational scanner mirror to define said magnetic track.

9. The method of claim 7 further including the step of carrying said multi-faceted mirror on a scanner frame, and using a circuit board carrying said sensor head to support said scanner frame from a housing of said thermal imaging device.

* * * * *